(12) United States Patent
Rozzi (10) Patent No.: US 7,016,082 B2
(45) Date of Patent: Mar. 21, 2006

(54) HALFTONE DOT THINNING

(75) Inventor: William A. Rozzi, Stillwater, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 833 days.

(21) Appl. No.: 09/899,687

(22) Filed: Jul. 5, 2001

(65) Prior Publication Data

US 2003/0007185 A1 Jan. 9, 2003

(51) Int. Cl.
*G06K 15/00* (2006.01)
*G06K 9/36* (2006.01)

(52) U.S. Cl. .................... 358/3.28; 382/242; 382/243; 382/249

(58) Field of Classification Search ................ 382/190, 382/193, 194, 195, 196, 197, 201, 242, 243, 382/249; 358/3.28, 3.3, 3.26, 3.36, 426.13
See application file for complete search history.

(56) References Cited

U.S. PATENT DOCUMENTS

| | | | |
|---|---|---|---|
| 5,113,251 A | * | 5/1992 | Ichiyanagi |
| 5,353,387 A | | 10/1994 | Petschik et al. |
| 5,526,140 A | | 6/1996 | Rozzi |
| 5,602,572 A | | 2/1997 | Rylander |
| 5,706,414 A | | 1/1998 | Pritchard |
| 5,774,157 A | | 6/1998 | Kinoshita et al. |
| 5,809,215 A | | 9/1998 | Heydinger et al. |
| 5,923,345 A | | 7/1999 | Imai |
| 5,975,672 A | | 11/1999 | Wen |
| 5,992,962 A | | 11/1999 | Yen et al. |
| 6,046,822 A | | 4/2000 | Wen et al. |
| 6,067,405 A | | 5/2000 | Serra |
| 6,099,104 A | | 8/2000 | Sato et al. |

FOREIGN PATENT DOCUMENTS

| | | |
|---|---|---|
| EP | 0 580 376 A1 | 1/1994 |
| EP | 1 014 296 A2 | 6/2000 |
| FR | 2 771 833 | 9/1998 |

OTHER PUBLICATIONS

Copy of PCT Written Opinion for International Application No. PCT/US02/23695, dated Mar. 26, 2003, 5 pgs.
Copy of PCT Written Opinion for International Application No. PCT/US02/23695, dated Jul. 22, 2003, 6 pgs.
Copy of PCT International Preliminary Examination Report for International Application No. PCT/US02/23695, dated Feb. 9, 2004, 8 pgs.

* cited by examiner

*Primary Examiner*—Jerome Grant, II

(57) ABSTRACT

The invention provides techniques for thinning halftone dots in a halftone dot bit map. A bit map filter may be used to thin the dots. For example, a target glyph may passed over the bit map. If any subsets of bits within the bit map match the target glyph, the subsets of bits can be replaced with bits defined by a thinned glyph. In this manner, the ink of a halftone print can be reduced in a manner that enhances the visual appearance of the print.

31 Claims, 13 Drawing Sheets

FIG. 15

HALFTONE DOT THINNING

TECHNICAL FIELD

The invention relates to halftone printing, and more particularly to techniques for improving print quality in halftone printing.

BACKGROUND

Halftone printing techniques enable continuous tone images to be represented on a bi-level device, such as an inkjet printer, by simulating the screening process used in conventional printing. Some halftone techniques model continuous tone pixels with halftone cells. A halftone cell includes a number of points, each of which may be turned on or off. Various halftone dot patterns can be created by selectively turning particular points on. For example, as more points are turned on, the halftone cell appears more intense. Thus, less intense pixel values can be modeled by halftone cells that have more points turned off, and more intense pixel values can be modeled by halftone cells that have more points turned on. Various halftone modeling algorithms can be used to control whether points are turned on or off, depending on the continuous tone pixel value being modeled.

A halftone image file can be viewed as a bit map. Each bit is used to indicate whether a point is on or off. If halftone cells are used to create a halftone bit map, each cell defines a number of bits in the bit map. Halftone bit maps, however, can be created without generating the halftone cells that correspond to the continuous tone pixels. Indeed, halftone screening processes have been developed in which a continuous tone image file is converted into a halftone bit map without generating the individual halftone cells.

Halftone printing devices typically print dots of ink according to the halftone bit map. For example, if the point in the bit map is on, the printing device prints a dot in the area associated with the point, and if the point in the bit map is turned off, the printing device does not print a dot in the area associated with the point. Color halftone printing devices make use of different channels, e.g., Cyan (C), Magenta (M), Yellow (Y) and Black (K), to define colors. Thus, color halftone printing devices may use a plurality of monochromatic bit maps. Each monochromatic bit map defines the presence or absence of dots for a particular channel.

The visual appearance of halftone prints can be negatively impacted by overlap of ink in adjacent dots. For example, ink dots printed by a halftone printing device can smear or wick on the printing substrate. Moreover, if too much ink is applied, the printing substrate can be oversaturated, possibly causing the substrate to buckle or tear. In either case, the halftone print may appear visually incorrect.

SUMMARY

In general, the invention is directed to techniques for thinning halftone dots in a halftone dot bit map. A bit map filter may be used to thin the dots. For example, a target glyph may be defined and then passed over the bit map. If any subsets of bits within the bit map match the target glyph, the subsets of bits can be replaced with bits defined by a thinned glyph. In this manner, the ink of a halftone print can be reduced in a manner that enhances the visual appearance of the print. In particular, the invention may be effective to improve prints of ink jet printing devices where halftone dots may be generated from a plurality of overlapping ink drops.

In one embodiment, a method includes passing the target glyph over a monochromatic halftone bit map and comparing the target glyph to a number of subsets of bits. The method may also include replacing a particular subset of bits with the thinned glyph whenever the target glyph matches the particular subset of bits. The method can be repeated for different channels of a color image to provide ink thinning for various different monochromatic halftone bit maps corresponding to the different channels, e.g., C, M, Y and K.

In other embodiments, the invention may comprise a computer readable medium carrying program code that when executed, performs one or more of the methods described herein. In still other embodiments, the invention may comprise a system for performing one or more of the methods described herein. For example, the system may include a memory that stores a monochromatic halftone bit map and a processor that applies a bit map filter to the monochromatic halftone bit map. The system may be a printer that automatically performs the thinning techniques, or alternatively, the system may be computer that drives the printer.

The various dot thinning techniques according to the invention provide several advantages. For example, in general, the invention can provide a more visually pleasing rendition of an image on a halftone device by avoiding unwanted artifacts in the halftone print. In particular, the dot thinning techniques can ensure that normal text does not appear bold, and can avoid "false moire," or other unwanted artifacts within an image. In addition, dot thinning techniques promote more efficient use of ink, and can ensure that print substrates do not become oversaturated.

The invention also provides several advantages over conventional dot thinning techniques. Some conventional techniques operate on halftone cells that comprise input data that is used to generate a halftone bit map. The techniques, according to the invention, however, may be used to operate on the generated halftone bit map itself. This is highly advantageous because it avoids the need to modify halftone cell input which can be difficult or impossible to access in many scenarios. In addition, sometimes halftone bit maps can be generated via a screening process that does not make use of halftone cells as input. In that case, conventional thinning techniques may not be able to effectively thin a print. The techniques described below, however, can operate on a halftone bit map regardless of the techniques or input data used to generate the halftone bit map.

Additional details of these and other embodiments are set forth in the accompanying drawings and the description below. Other features, objects, and advantages of the invention will be apparent from the description and drawings, and from the claims.

DETAILED DESCRIPTION

The invention provides techniques for thinning halftone dots in a halftone dot bit map. In other words, the invention provides techniques for selectively removing halftone dots from a halftone print so that unwanted artifacts are avoided in the halftone print. Techniques according to the invention operate on halftone bit maps which define the print. For this reason, the need to access the input data used to generate the halftone bit map is avoided.

Figure 1:
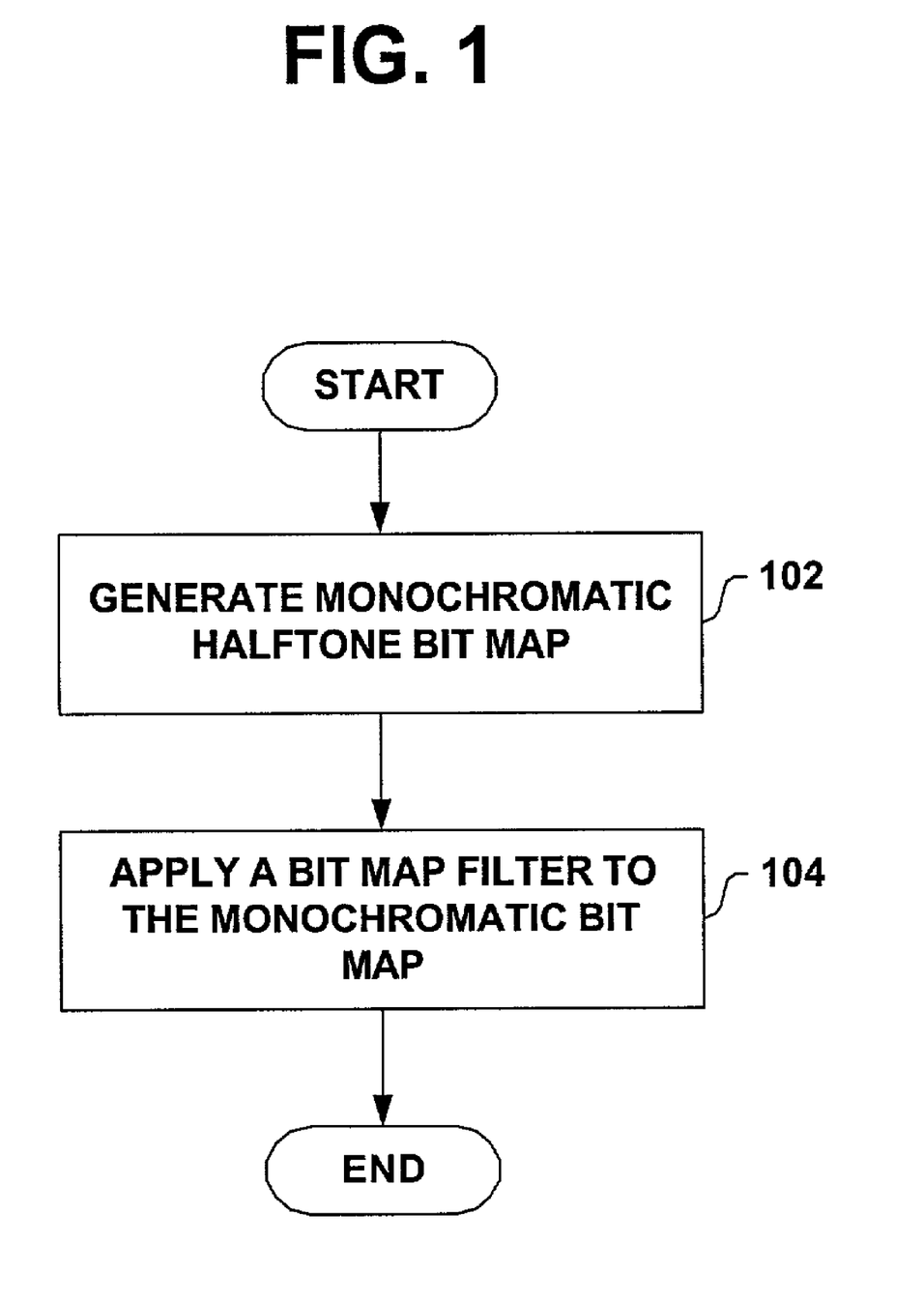
FIG. 1 is a flow diagram according to the invention.

FIG. 1 is a flow diagram according to the invention. As shown, a monochromatic halftone bit map is generated (102), and a bit map filter is applied to the monochromatic bit map (104). A monochromatic halftone bit map is a halftone bit map corresponding to a single colorant. Many color printing devices make use of different colorants, e.g., C, M, Y, and K to represent an array of colors. Halftone printing techniques can operate on each colorant independently by operating on monochromatic bit maps generated for each colorant. Thus, the process illustrated in FIG. 1 may be repeated for any number of monochromatic bit maps.

Monochromatic halftone bit maps can be generated (102) by a raster image processor (RIP). For example, RIPs such as the Configurable PostScript Interpreter (CPSI), available from Adobe Systems Inc. of San Jose, Calif., or Script-Works®, available from Harlequin Limited of Waltham, Mass., can be used to generate halftone bitmaps. By operating on generated halftone bit maps, the need to access input data used to generate the bit maps is avoided.

The bit map filter can be applied to the monochromatic bit map (104) to produce a filtered bit map that has a reduced number of halftone dots. As mentioned above, this can enable a more visually pleasing rendition of an image on a halftone device by avoiding unwanted artifacts. For example, if too much ink is applied on a substrate, "false moiré," or other unwanted artifacts may appear on the print. False moiré is an unwanted artifact that looks like a periodic structure within a print. In addition, dot thinning techniques promote efficient use of ink, and can help ensure that print substrates do not become oversaturated.

In one embodiment, applying the bit map filter comprises comparing a target glyph to a subset of bits in the monochromatic halftone bit map, and replacing the subset of bits with a thinned glyph if the target glyph matches the subset of bits. FIGS. 2–9 illustrate examples of target glyphs 201, 301, 401, 501, 601, 701,.801 and 901, and corresponding thinned glyphs 202, 302, 402, 502, 602, 702, 802 and 902. A target glyph and the corresponding thinned glyph are collectively referred to herein as a thinning glyph pair. Of course, FIGS. 2–9 are only illustrative, and thinning glyph pairs could be defined according to any desired shape.

In general, target glyphs are characterized as including a number points, all of which define ON-bits, i.e., bits with a 1 value as opposed to a 0 or "OFF" value. A thinned glyph generally has a shape corresponding to a target glyph, but the thinned glyph has one or more points which define OFF-bits. In FIGS. 2–9, the shaded areas define ON-bits and the unshaded areas define OFF-bits. ON-bits may indicate the presence of ink, while OFF-bits indicate the absence of ink. Alternatively, ON-bits may indicate the presence of a first amount of ink, while OFF-bits indicate the presence of a second amount of ink. Of course, an implementation could define ON-bits and OFF-bits in the opposite manner.

A target glyph can be compared to a subset of bits within a bit map. If the target glyph matches the subset of bits, the subset of bits can be replaced with the thinned glyph. In this manner, if a print includes a subset of bits which match a target glyph, that subset of bits can be thinned by replacing the subset with the thinned glyph. In some cases, replacing the subset of bits with the thinned glyph may simply involve changing the value of one or more bits in the subset of bits.

Applying the bit map filter may begin prior to finalizing the generating of the monochromatic halftone bit map. In other words, the bit map filter may be applied as part of an imaging pipeline. When enough bits in the bit map have been generated, the bit map filter may be applied by comparing subsets of bits to the target glyph. In other words, a pipelined implementation would operate on one, or a few lines of halftone points as they became available from the halftoning module of a RIP.

Alternatively, the bit map filter could be applied as a stand-alone filter. For example, a stand alone filter may receive halftone bitmaps as input. The output of the stand alone filter would be modified bitmaps with the same dimensions as the input bitmaps.

In one particular embodiment, a target glyph is passed over a monochromatic bit map. Then, each time the target glyph matches a particular subset of bits, that subset can be replaced by the thinned glyph. Indeed, multiple passes can be made through a monochromatic bit map using various different thinning glyph pairs.

In another embodiment, the thinning process of passing a target glyph over a monochromatic bit map and replacing subsets of bits with the thinned glyph is first performed. Then, the print is printed and inspected to determine whether the thinning process was effective. Depending on the quality of the print, the thinning process may be repeated using a different thinning glyph pair. In this manner, the ultimate result can be optimized by using the thinning glyph pair that yields the best result.

In some cases, it may be desirable not to thin the edges of a print. In those cases, the thinning process may include the operation of detecting an edge of the print and ensuring that one or more bits corresponding to the edge are not changed by a thinned glyph. For example, both vertical and horizontal edges could be detected to ensure that bits at or near the edges are not changed. In other cases, it may be desirable to avoid thinning in particular regions of a print. In those cases, a mask could be applied prior to applying the filter. For example, the mask could be used to define areas of the monochromatic halftone bit map to which the filter is to be applied.

Figure 10:
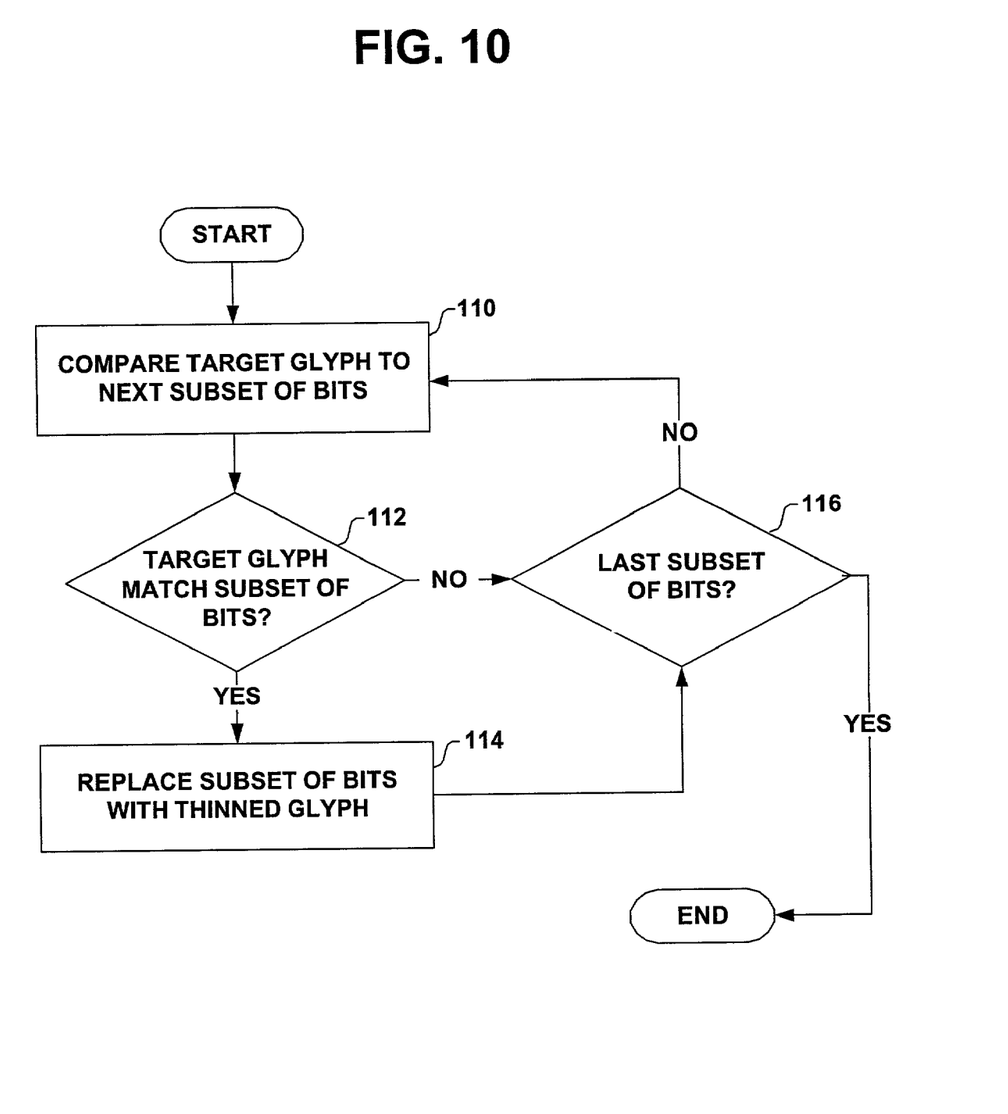
FIG. 10 is another flow diagram according to the invention.

FIG. 10 is another flow diagram illustrating a method according to the invention. The method of FIG. 10, is not necessarily limited to use with monochromatic bit maps. As shown, a target glyph is compared to a subset of bits (110). If the target glyph matches the subset of bits (112), the subset of bits is replaced with a thinned glyph (114). If the target glyph does not match the subset of bits (112), the process may continue by examining subsequent subsets of bits. The process may continue until the last subset of bits have been examined (116). After the last subset of bits have been examined, a thinned halftone bit map can be defined.

Having defined a thinned halftone bit map, the method may also include printing a print on a substrate according to the thinned halftone bit map. The print may then be examined. If the print is unacceptable, the target glyph and the thinned glyph, i.e., the thinning glyph pair, may be redefined. The method of FIG. 10 may then be repeated. In this manner, the optimal thinned halftone bit map can be generated and identified.

Figure 11:
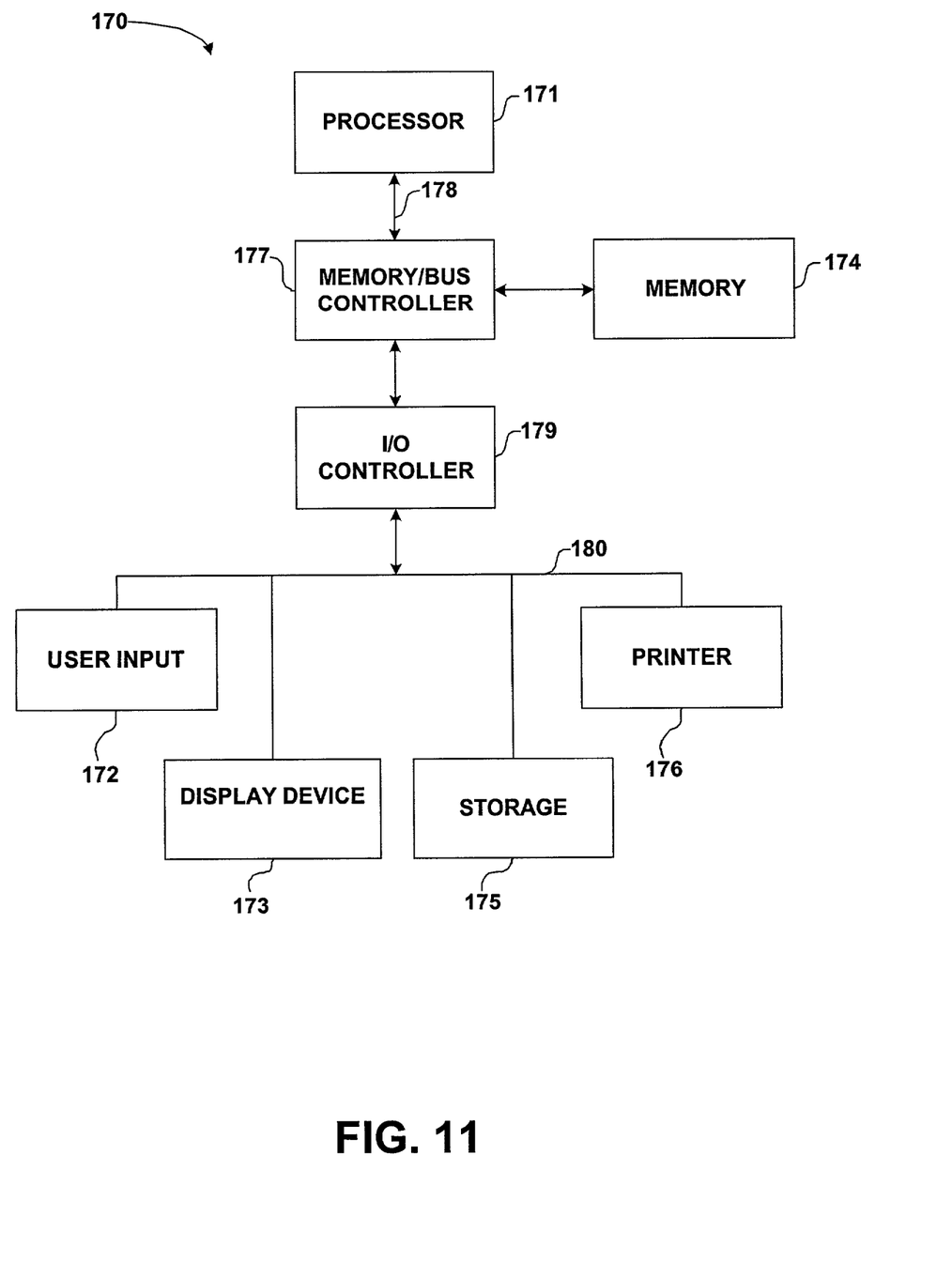
FIG. 11 is a block diagram illustrating a system suitable for implementation of dot thinning techniques according to the invention.

FIG. 11 is a block diagram illustrating a system 170 suitable for implementation of dot thinning techniques according to embodiments of the invention. As shown in FIG. 11, system 170 may include processor 171, user input device 172, display device 173, memory 174, storage device 175, and printer 176. System 170 may substantially conform to conventional systems used by graphic artists and other users in the creation of graphic imagery for electronic display or print production. A memory/bus controller 177 and system bus 178 couple processor 171 and memory 174, while one or more I/O controllers 179 and I/O bus 180 couple the processor and memory to user input device 172, display device 173, storage device 175, and printer 176.

Processor 171 may take the form of a general purpose microprocessor and can be integrated with or form part of a PC, Macintosh, computer workstation, hand-held data terminal, palm computer, digital paper, or the like. User input device 172 may include a conventional keyboard and pointing device such as a mouse, pen, or trackball, if desired. Memory 174 may include random access memory (RAM) storing program code that is accessed and executed by processor 171 to carry out the dot thinning techniques and possibly other imaging techniques.

The program code can be loaded into memory 174 from storage device 175, which may take the form of a fixed hard drive or removable media drive associated with system 170. For example, the program code can be initially carried on computer-readable media such as magnetic, optical, magneto-optic or other disk or tape media. Alternatively, the program code may be loaded into memory from electronic computer-readable media such as electrically-erasable-programmable-read-only-memory (EEPROM), or downloaded over a network connection. If downloaded, the program code may be initially embedded in a carrier wave or otherwise transmitted on an electromagnetic signal. The program code may be embodied as a feature in an application program providing a wide range of imaging functionality.

In other embodiments, a processor and memory may be included within a printer. In those cases, the program code may be loaded directly into the memory within the printer. The printer may perform one or more of the techniques described above without the use of a conventional host computer.

Figure 12A:
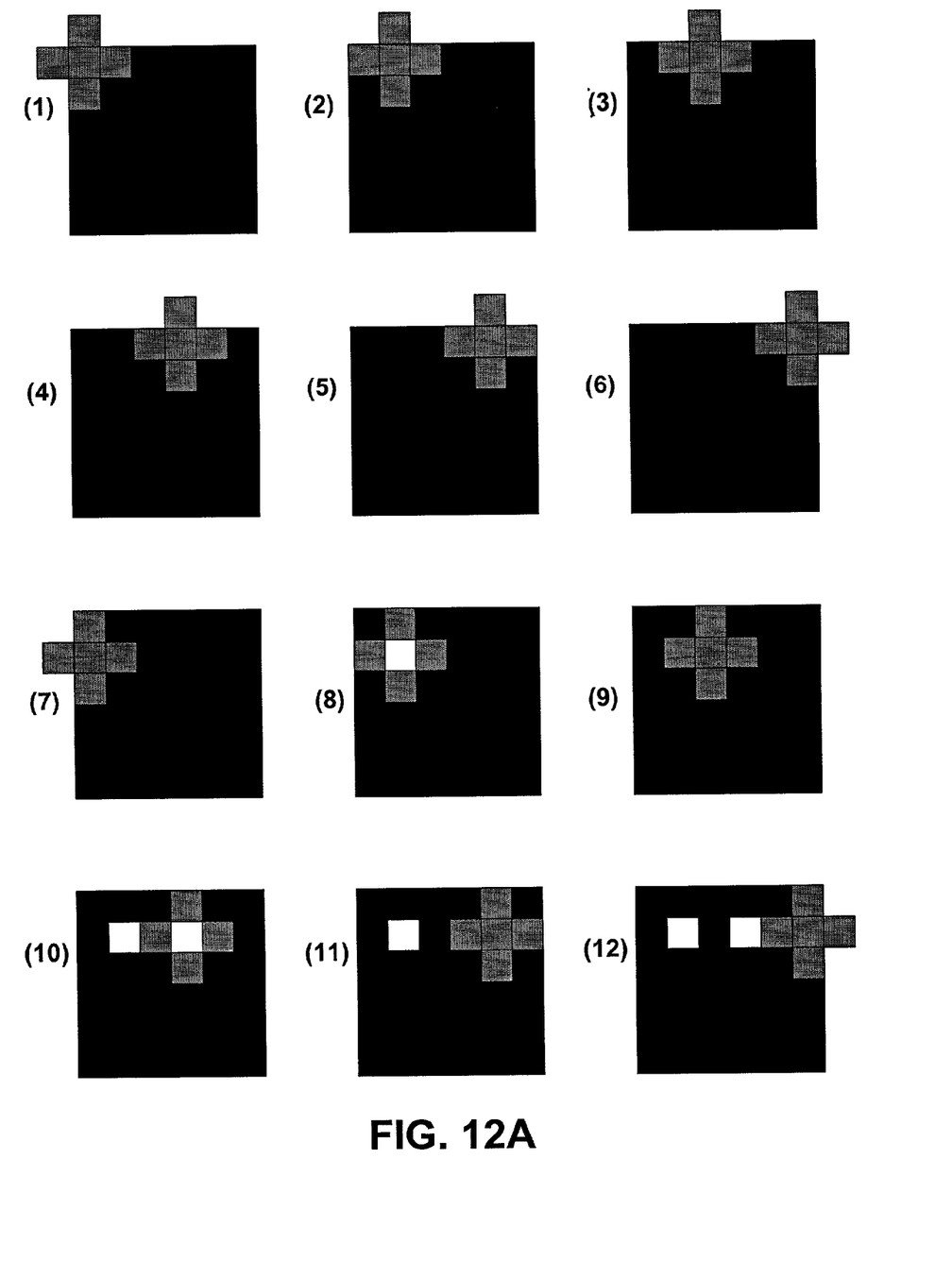
FIGS. 12A–12C include a series of illustrative diagrams showing the operation of an exemplary process according to the invention.
Figure 12B:
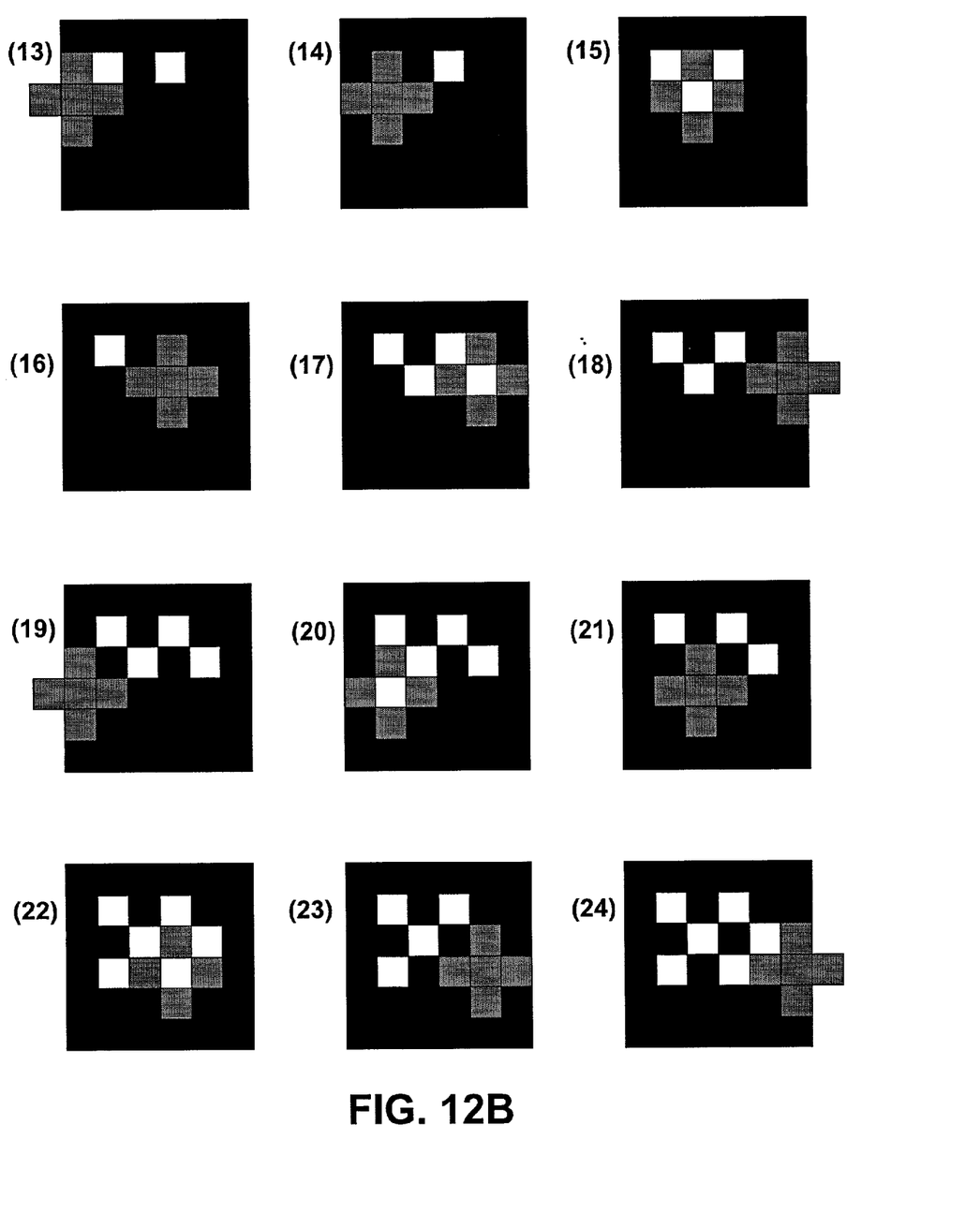
Figure 12C:
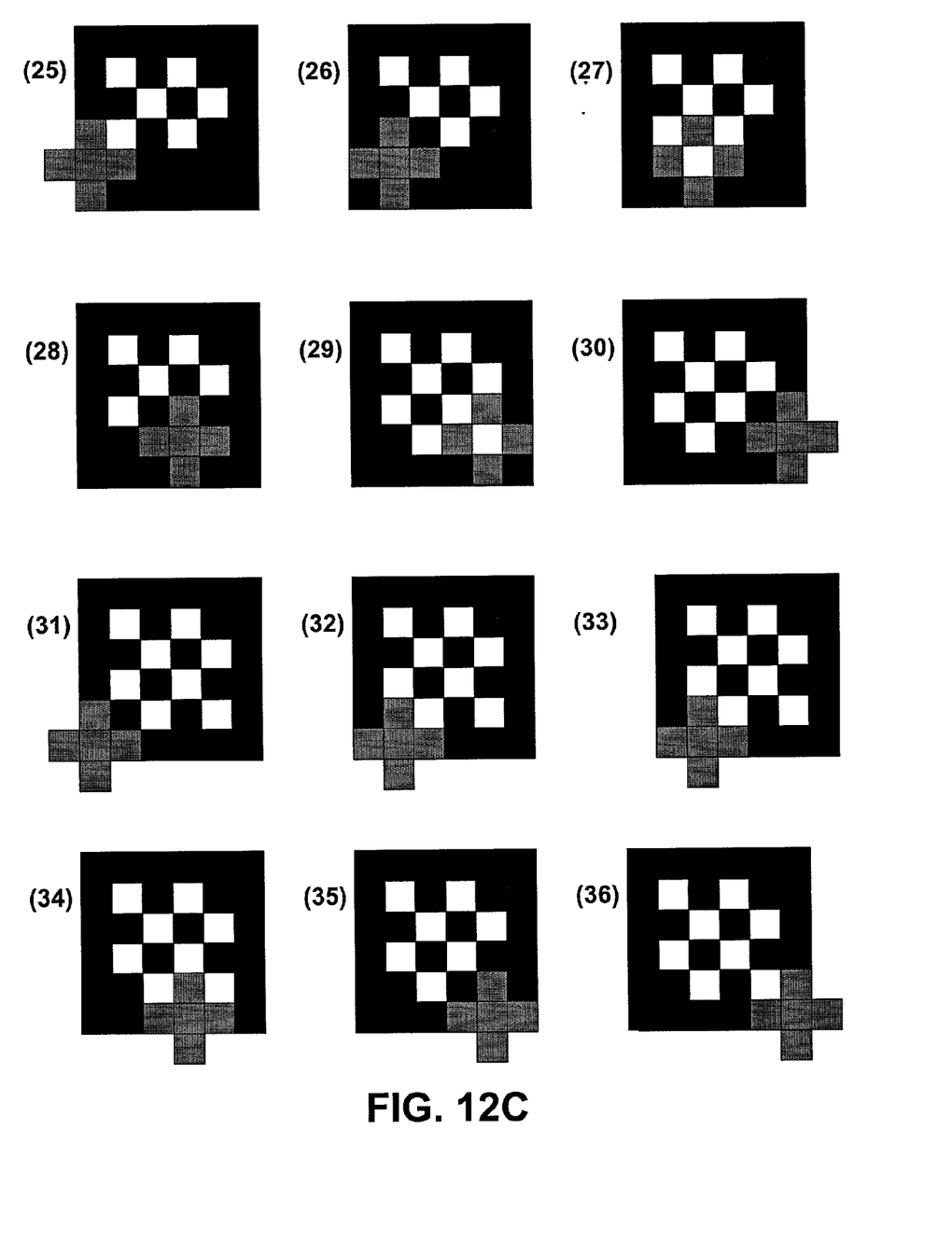

FIGS. 12A–12C include a series of illustrative diagrams showing the operation of an exemplary process according to the invention. As shown collectively in FIGS. 12A–12C, a target glyph (201, FIG. 2) is passed over a bit map. The target glyph is compared with subsets of bits as it moves bit by bit, and line by line over the bit map. As shown in FIGS. 8A–8C, thirty six different comparisons are made. The number of comparisons may be related to the size of the bit map. Bit maps, for example, may include millions or even billions of individual points.

At comparisons (8), (10), (15), (17), (20), (22) (27) and (29), the target glyph matches the subset of bits. Thus, the thinned glyph (202, FIG. 2) replaces the subset of bits. In other words, the bit corresponding to the center of the plus-shaped subset of bits is turned off. The particular bits that get turned off by the process may depend on the order in which the individual subsets of bits are examined. For example, if the process began in the upper right hand corner, the matches would occur with different subsets of bits, and thus, different bits would be turned off.

Processing time may be improved by skipping processing in the neighborhood of a thinned glyph replacement. For example, after the replacement at comparison (15), comparisons (16) and (21) could be skipped since, after the replacement at comparison (15), comparisons (16) and (21) would never yield a match. In other words, the result of comparison (15), i.e., a thinned glyph replaces the subset of bits, makes it impossible for comparisons (16) and (21) to yield a match.

Figure 13:
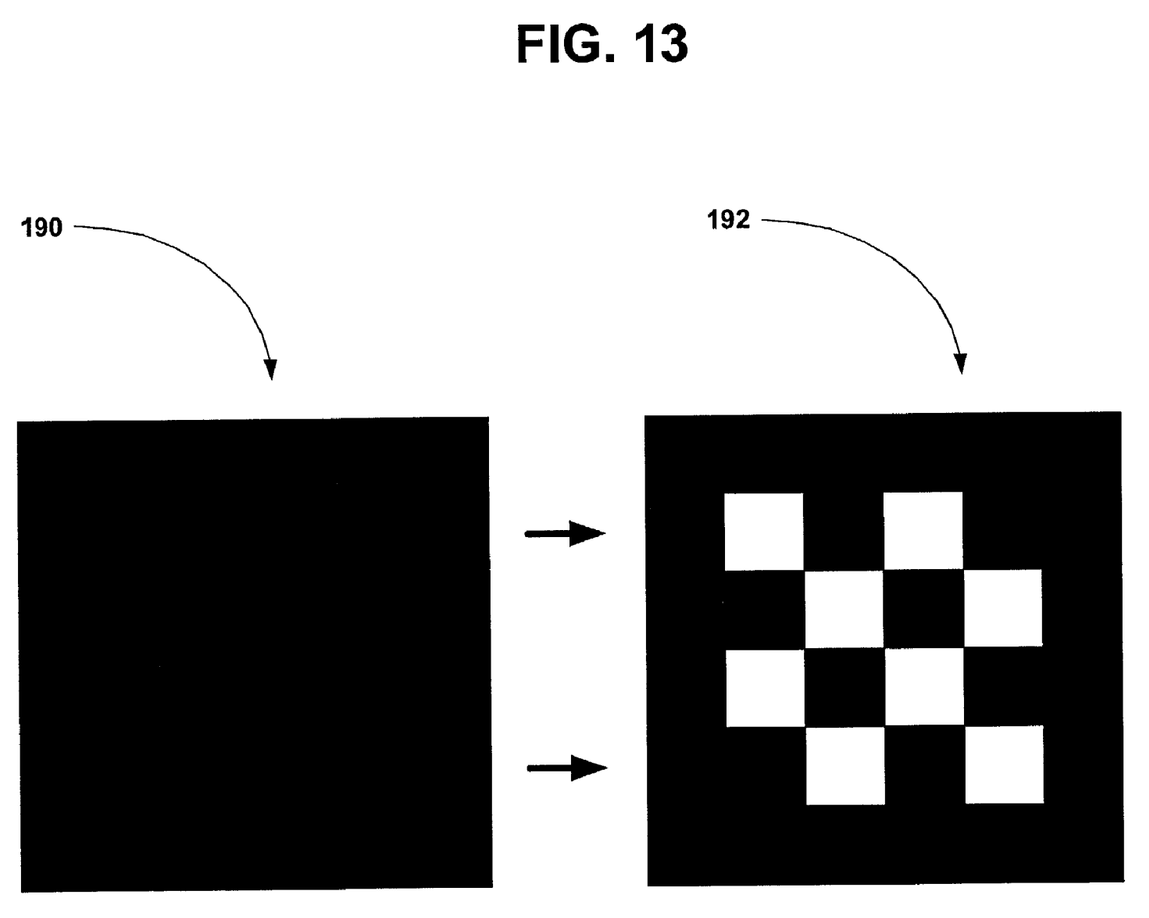
FIG. 13 illustrates a halftone bit map and a filtered halftone bit map that can be generated from the halftone bit map according to the invention.

FIG. 13 illustrates a halftone bit map 190 and a filtered halftone bit map 192 according to the invention. The halftone bit map 190 corresponds to the bit map prior to comparison (1) of FIG. 12A. The filtered halftone bit map 192 corresponds to the bit map after comparison (36) of FIG. 12C. Filtered halftone bit map 192 can be generated from halftone bit map 190 using the techniques described above. Filtered bit map 192 may enable a more visually pleasing rendition of an image to be rendered by a halftone device by avoiding unwanted artifacts in the halftone print.

The particular target glyphs and thinned glyphs that are used may depend on the imaging device. For example, a spot size of an ink spot formed by a device relative to the dimensions of a point within the bit map can be used to determine which thinning glyph pairs are used. For example, the glyph pair illustrated in FIG. 2 may be suitable for use when the effective spot size diameter is greater than or equal to twice the maximum of the width or height of a point in the bit map. The glyph pairs illustrated in FIGS. 4 and 5 may be suitable for use when the effective spot size diameter is greater than or equal to the square root of 5 multiplied by the maximum of the width or height of a point in the bit map. In general, when the device prints dots according to the thinned glyph, the dots should cover all of the points in the target glyph.

Figure 2:
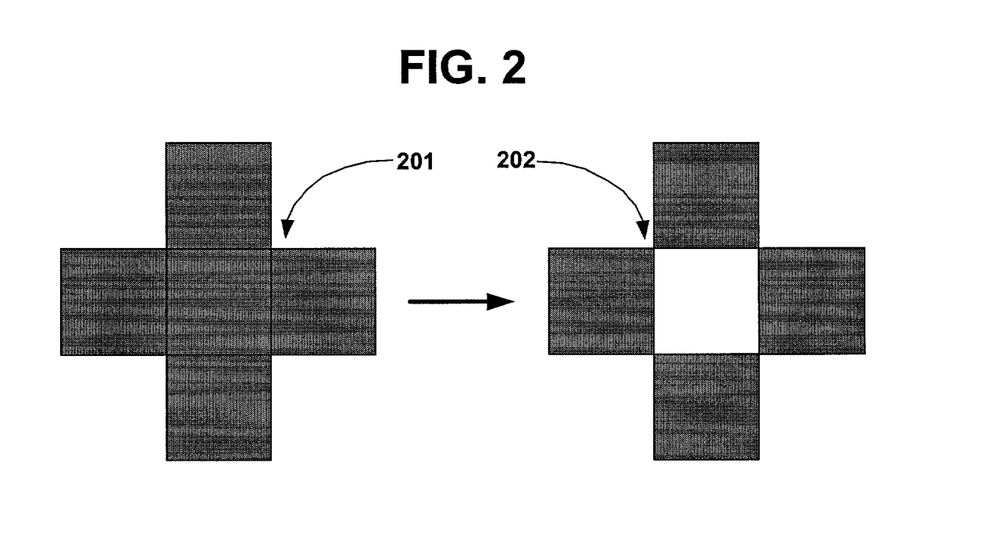
FIGS. 2–9 illustrate exemplary target glyphs and corresponding thinned glyphs.
Figure 3:
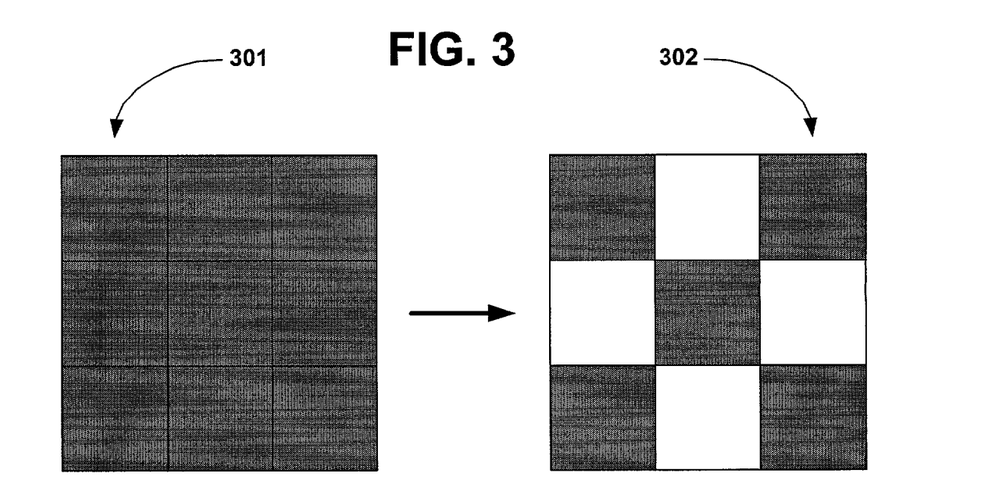
Figure 4:
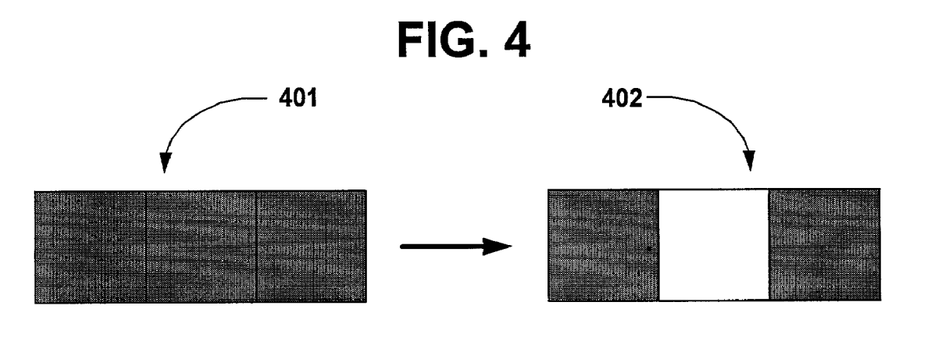
Figure 14:
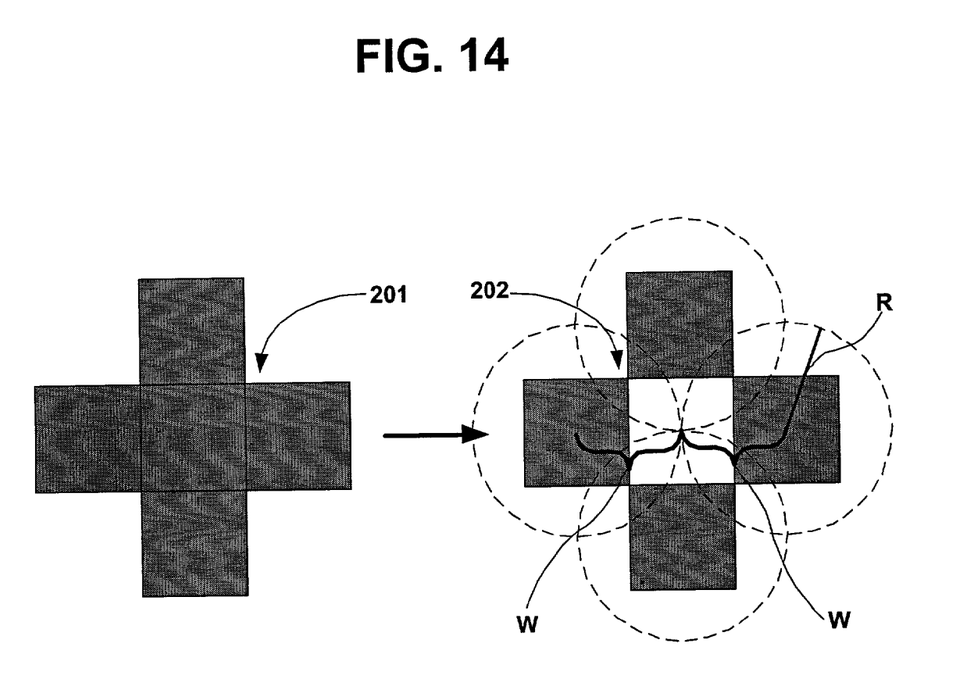
FIG. 14 is another illustration of the glyph pair of FIG. 2.

FIG. 14 is another illustration of the target glyph 201 and thinned glyph 202 of FIG. 2. The spot size of an ink droplet (indicated by the dotted lines) may be defined by the diameter (D)=2R, where R is the radius of the ink droplet. The glyph pair illustrated in FIG. 14 may be suitable for use when the effective spot size diameter is greater than or equal to twice the maximum width (W) of a point in the bit map. This spot diameter to point dimension ratio can be derived by considering the spot diameters that are required to ensure that the ON-bits in the thinned bitmap, when printed, completely cover the OFF-bits in the thinned bitmap. If desired, an additional error factor may be used to better ensure ink coverage in the OFF-bits in the thinned bitmap even if the radius R varies by some amount. In other words, the glyph pair illustrated in FIG. 14 may be defined as suitable when D>2W+E, where E is the error factor.

Figure 5:
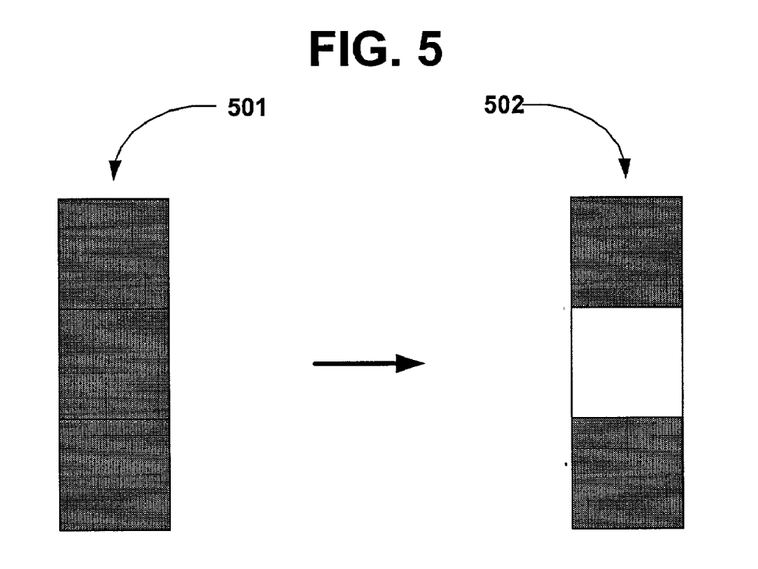
Figure 6:
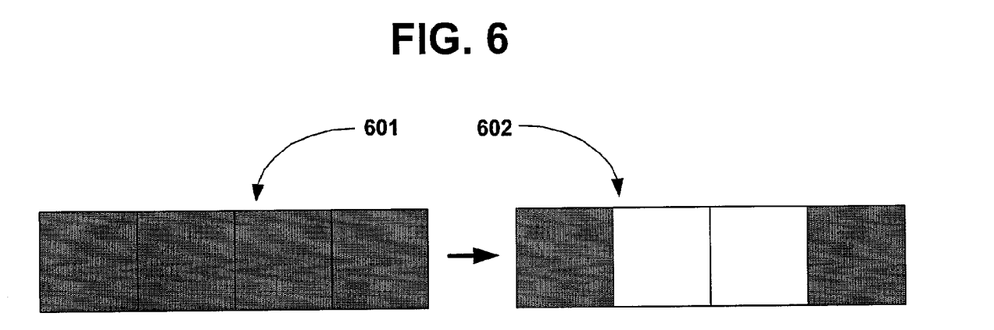
Figure 7:
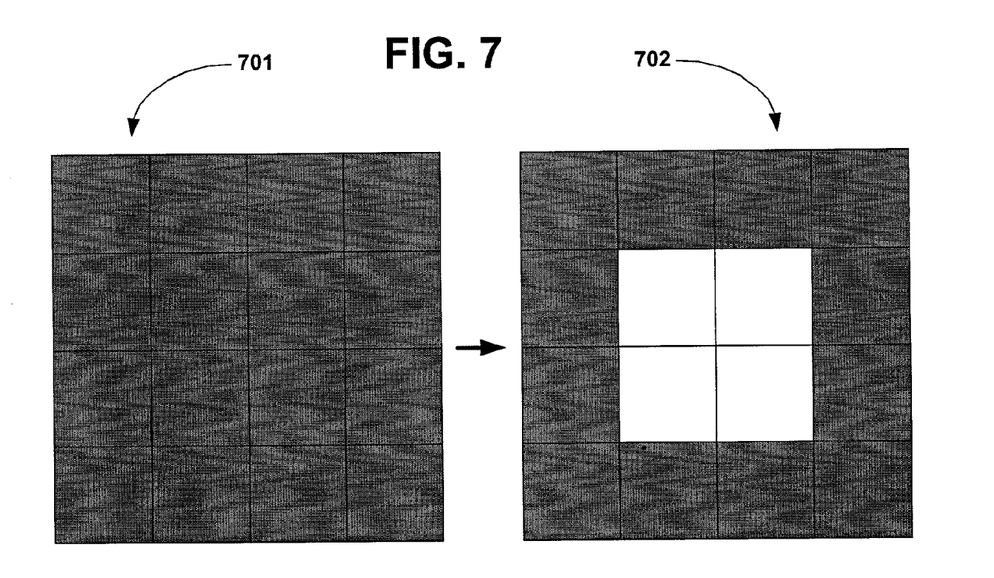
Figure 8:
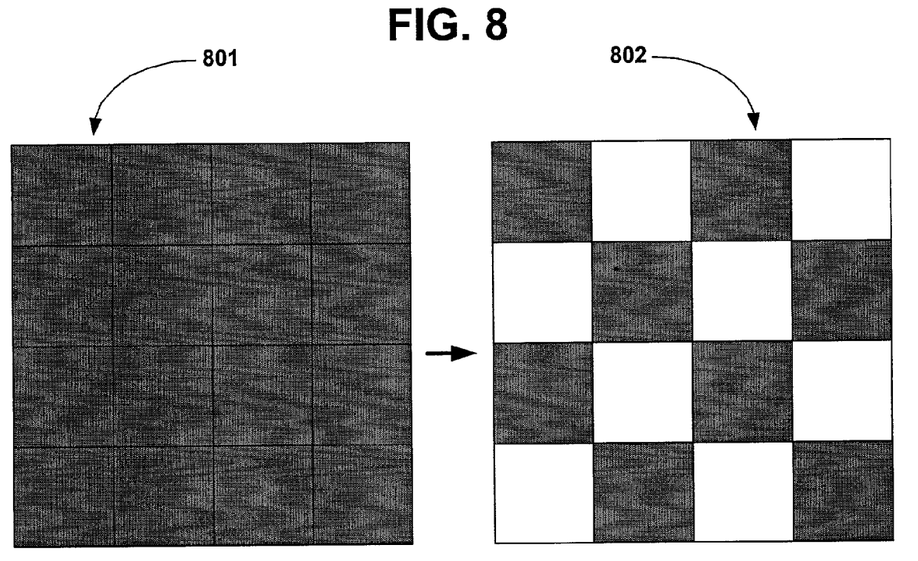
Figure 9:
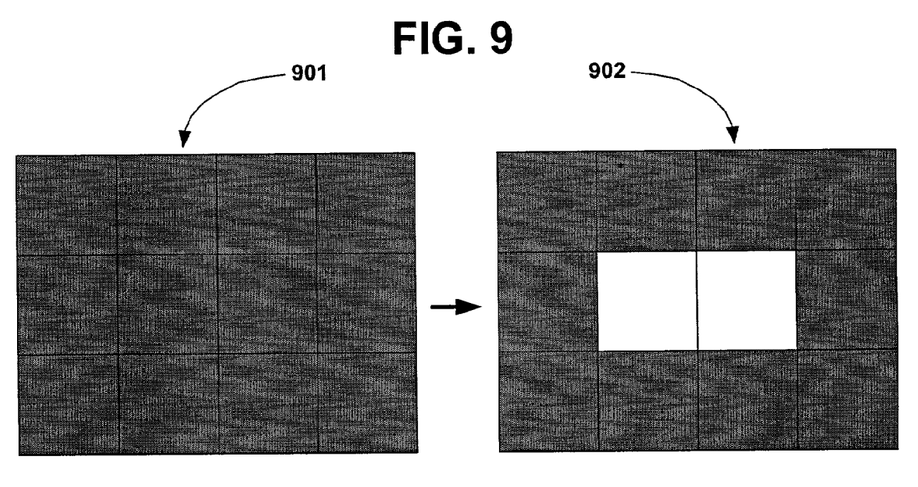
Figure 15:
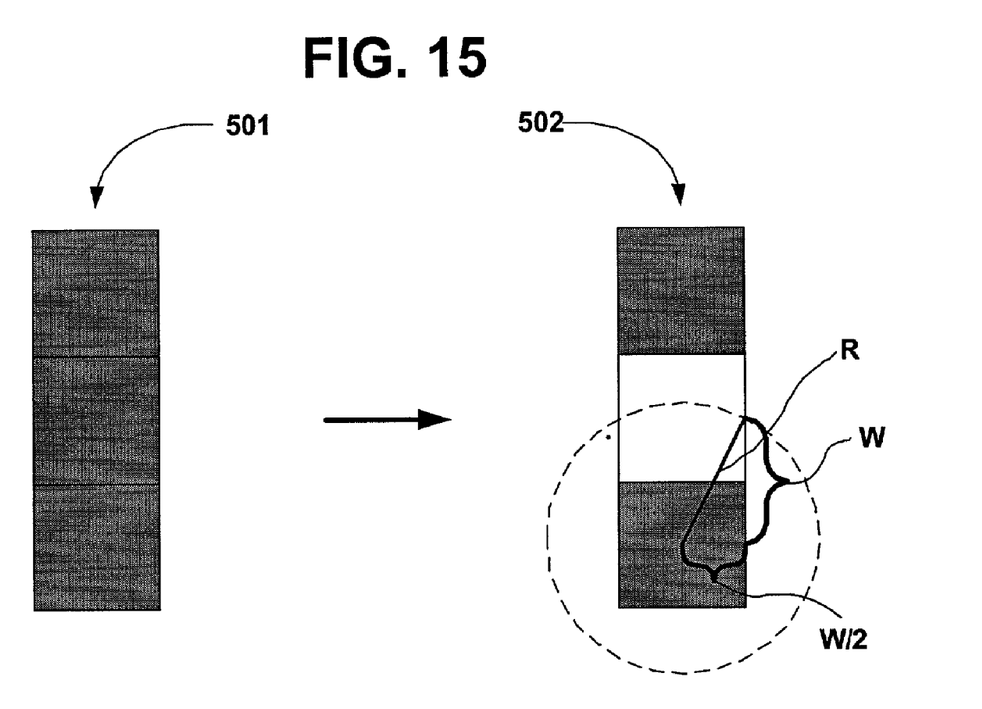
FIG. 15 is another illustration of the glyph pair of FIG. 5.

FIG. 15 is another illustration of the target glyph 501 and thinned glyph 502 of FIG. 5. The glyph pair illustrated in FIG. 15 may be suitable for use when the effective spot size diameter is greater than or equal to the square root of 5 multiplied by the maximum width (W) of a point in the bit map. Again, this spot diameter to point dimension ratio can be derived by considering the spot diameters that are required to ensure that the ON-bits in the thinned bitmap, when printed, completely cover the OFF-bits in the thinned bitmap. In other words:

$$R^2=(W/2)^2+W^2$$

$$R^2=(W)^2(1/4+1)$$

$$R^2=5/4(W)^2$$

$R = [(\sqrt{5})/2]W$ $D = 2R = (\sqrt{5})W$

Again, an additional error factor may be used to better ensure ink coverage in the OFF-bits in the thinned bitmap even if the radius R varies by some amount. In other words, the glyph pair illustrated in FIG. 15 may be defined as suitable when $D > (\sqrt{5})W + E$.

The plus-shaped glyphs in the glyph pair illustrated in FIG. 2 and FIG. 14 may work particularly well for a number of reasons. As mentioned above, the glyph pair illustrated in FIG. 2 and FIG. 14 is suitable for use when the effective spot size diameter is greater than or equal to twice the maximum of the width or height of a point in the bit map. Importantly, this premise holds true for many halftone printing devices. In addition, the glyph pair illustrated in FIG. 2 and FIG. 14 is advantageous because it never yields a match that effectively turns off bits on the edge of a print. Thus, the need to perform edge detection may be avoided.

A relatively simple way of determining which glyph pair will yield the best result for a given device is by printing test pages which have color patches. Test pages may be printed for various different target glyphs and thinned glyphs, and then compared to one another. Generally, if the color patches are printed without holes (i.e., regions where ink coverage was desired or expected, but no ink is present) or other artifacts such as false moiré, the thinning can be viewed as effective.

In some embodiments, various different glyph pairs may be marked as active. Thus, after printing test pages, and identifying which glyph pairs are most effective, those effective glyphs can be chosen as active and then used in thinning processes for subsequent prints. Other glyph pairs may be marked as inactive. Alternatively, multiple glyph pairs could be marked as active and prioritized to define which glyph pairs are applied first. In other words, even better results may be achieved by passing numerous different target glyphs over a bit map. More aggressive glyph pairs may be given higher priority so that they are passed over the bit map first. The invention, however, is not limited in that respect.

In some cases, glyph pairs can be marked as active after comparing spot size of ink droplets to the maximum width of a point in the bit map. For example, the glyph pair illustrated in FIG. 2 and FIG. 14 may be marked as active when D>2W+E, where E is an error factor. Similarly, the glyph pair illustrated in FIG. 5 and FIG. 15 may be marked as active when $D > (\sqrt{5})W + E$.

A number of embodiments of the invention have been described. For example, dot thinning techniques have been described which can improve print quality on halftone imaging devices. Nevertheless, various modifications may be made without departing from the scope of the invention. For example, other glyph pairs could be used. Accordingly, other embodiments are within the scope of the following claims.

The invention claimed is:

1. A method of reducing ink coverage for inkjet printing comprising:
   generating a monochromatic halftone bit map of a print to be printed by an inkjet printer; and
   applying a bit map filter to the monochromatic halftone bit map to generate a filtered bit map for the inkjet printer, wherein applying the filter comprises comparing a target glyph to a subset of bits in the monochromatic halftone bit map, and replacing the subset of bits with a thinned glyph if the target glyph matches the subset of bits.

2. The method of claim 1, wherein the monochromatic halftone bit map is a first monochromatic halftone bit map corresponding to a first colorant, the method further comprising:
   generating a second monochromatic halftone bit map of the print, the second monochromatic halftone bit map corresponding to a second colorant; and
   applying the bit map filter to the second monochromatic halftone bit map.

3. The method of claim 1, further comprising printing a colorant of the print on a substrate according to the filtered bit map.

4. The method of claim 3, further comprising examining the substrate and determining whether it is acceptable.

5. The method of claim 1, further comprising:
   passing the target glyph over the monochromatic halftone bit map;
   comparing the target glyph to a number of subsets of bits; and
   replacing a particular subset of bits with the thinned glyph whenever the target glyph matches the particular subset of bits.

6. The method of claim 1, the method further comprising:
   comparing a second target glyph to a second subset of bits in the monochromatic halftone bit map; and
   replacing the second subset of bits with a second thinned glyph if the second target glyph matches the second subset of bits.

7. The method of claim 1, further comprising detecting an edge of the print and ensuring that a bit corresponding to the edge is not changed by a thinned glyph.

8. The method of claim 1, wherein the target glyph includes ON-bits and the thinned glyph includes ON-bits and OFF-bits.

9. The method of claim 8, wherein the target glyph includes five ON-bits forming a plus shape and the thinned glyph includes four ON-bits and one OFF-bit.

10. The method of claim 9, wherein thinned glyph forms a plus shape, the OFF-bit of the thinned glyph being in the center of the four ON-bits of the thinned glyph.

11. The method of claim 8, wherein the target glyph includes three ON-bits and the thinned glyph includes two ON-bits and one OFF-bit, the OFF-bit being located between the two ON-bits in the thinned glyph.

12. The method of claim 8, wherein the ON-bits indicate the presence of ink and the OFF-bits indicate the absence of ink.

13. The method of claim 8, wherein the ON-bits indicate the presence of a first amount of ink and the OFF-bits indicate the presence of a second amount of ink.

14. The method of claim 1, further comprising applying a mask prior to applying the filter, the mask defining areas of the monochromatic halftone bit map to which the filter is to be applied.

15. The method of claim 1, wherein applying the bit map filter begins prior to finalizing the generating of the monochromatic halftone bit map.

16. The method of claim 1, wherein generating the monochromatic halftone bit map of the print includes converting a number of halftone cells into the monochromatic halftone bit map, each halftone cell including a number of points that are selectively turned on to model a continuous tone pixel.

17. The method of claim 1, wherein generating the monochromatic halftone bit map of the print includes a screening process that does not make use of halftone cells.

18. A method of reducing ink coverage for inkjet printing comprising:
comparing a target glyph to a subset of bits within a halftone bit map associated with a print to be printed by an inkjet printer; and
replacing the subset of bits within the halftone bit map with a thinned glyph if the target glyph matches the subset of bits to generate a filtered halftone bit map for the inkjet printer.

19. The method of claim 18, further comprising:
passing the target glyph over the halftone bit map;
comparing the target glyph to a number of subsets of bits; and
creating the filtered halftone bit map by replacing a particular subset of bits with the thinned glyph whenever the target glyph matches the particular subset of bits.

20. The method of claim 19, further comprising printing a print on a substrate according to the filtered halftone bit map.

21. The method of claim 20, further comprising examining the substrate and re-defining the target glyph and thinned glyph if the substrate appears unacceptable.

22. The method of claim 21, further comprising:
passing the re-defined target glyph over the halftone bit map;
comparing the re-defined target glyph to the number of subsets of bits; and
creating a second filtered halftone bit map by replacing a particular subset of bits with the re-defined thinned glyph whenever the re-defined target glyph matches the particular subset of bits.

23. A computer readable medium carrying program code that, when executed reduces ink coverage for inkjet printing by:
generating a monochromatic halftone bit map of a print to be printed by an inkjet printer; and
applying a bit map filter to the monochromatic halftone bit map to generate a filtered bit map, wherein applying the filter comprises comparing a target glyph to a subset of bits in the monochromatic halftone bit map, and replacing the subset of bits with a thinned glyph if the target glyph matches the subset of bits.

24. A computer readable medium carrying program code that reduces ink coverage for inkjet printing wherein the program code, when executed:
compares a target glyph to a subset of bits within a halftone bit map associated with a print to be printed by an inkjet printer; and
replaces the subset of bits within the halftone bit map with a thinned glyph if the target glyph matches the subset of bits to generate a filtered bit map for the inkiet printer.

25. A system that reduces ink coverage for inkjet printing comprising:
a memory that stores a monochromatic halftone bit map associated with a print to be printed by an inkjet printer; and
a processor coupled to the memory that applies a bit map filter to the monochromatic halftone bit map to generate a filtered bit map for the inkjet printer, wherein the processor applies the bit map filter by:
passing the target glyph over the monochromatic halftone bit map;
comparing the target glyph to a number of subsets of bits; and
replacing a particular subset of bits with the thinned glyph whenever the target glyph matches the particular subset of bits to generate the filtered bit map.

26. The system of claim 25, wherein the system is an inkjet printer.

27. The system of claim 25, wherein the system is coupled to an inkjet printer.

28. A system that reduces ink coverage for inkjet printing comprising:
a memory that stores a halftone bit map associated with a print to be printed by an inkjet printer, a target glyph and a thinned glyph; and
a processor coupled to the memory that compares the target glyph to a subset of bits within the bit map, and replaces the subset of bits within the bit map with the thinned glyph if the target glyph matches the subset of bits to generate a filtered bit map for the inkjet printer.

29. The system of claim 28, wherein the system is an inkjet printer.

30. The system of claim 28, wherein the system is coupled to an inkjet printer.

31. A method of reducing ink coverage for a halftone printing device comprising:
generating a monochromatic halftone bit map of a channel of a color image to be printed by the halftone printing device; and
applying a bit map filter to the monochromatic halftone bit map to generate a filtered bit map for the halftone printing device by passing a target glyph over the monochromatic halftone bit map, comparing the target glyph to a number of subsets of bits in the monochromatic halftone bit map, and replacing a particular subset of bits with a thinned glyph when the target glyph matches the particular subset of bits, wherein applying the bit map filter begins prior to finalizing the generating of the monochromatic halftone bit map.

* * * * *